United States Patent [19]

Tanka et al.

[11] Patent Number: 4,819,160
[45] Date of Patent: Apr. 4, 1989

[54] METHOD OF PROCESSING DATA ACCESS IN A DATABASE MANAGEMENT SYSTEM WITH DATA DICTIONARY DIRECTORY

[75] Inventors: Kazuaki Tanka, Sagamihara; Ichiro Yokoyama; Shigeru Yoneda, both of Ebina; Satoshi Wakayama, Kawasaki; Makoto Urakawa, Yokohama; Takashi Iihama, Hiratsuka, all of Japan

[73] Assignee: Hitachi, Ltd., Tokyo, Japan

[21] Appl. No.: 4,072

[22] Filed: Jan. 16, 1987

[30] Foreign Application Priority Data

Jan. 16, 1986 [JP] Japan .................................. 61-4927

[51] Int. Cl.$^4$ ...................... G06F 13/00; G06F 15/40
[52] U.S. Cl. ..................................... 364/300; 364/200
[58] Field of Search ... 364/200 MS File, 900 MS File, 364/300

[56] References Cited

U.S. PATENT DOCUMENTS 4,130,867 12/1978 Bachman et al. .................. 364/200
4,476,528 10/1984 Matsumoto et al. ............... 364/200
4,631,664 12/1986 Bachman ........................... 364/300

OTHER PUBLICATIONS

"The Integrated Dictionary/Directory System" written by Allen et al, Computing Surveys, vol. 14, No. 2, 6/82, pp. 245-275.

Primary Examiner—Eddie P. Chan
Attorney, Agent, or Firm—Antonelli, Terry & Wands

[57] ABSTRACT

In a database system having a dictionary/directory for collective management of definition information of the database system, when an application program is compiled to generate an object module, it is confirmed, by referring to the definition information stored in the dictionary, if a database access instruction in the application program is correctly operable. The confirmed definition information is incorporated within an object module which is edited to generate a load module. During execution of the load module, a database access control is effected using the definition information of the database system in the directory as well as the definition information incorporated at the compiling stage.

5 Claims, 12 Drawing Sheets

DATA DIVISION ANALYSIS PROCESS

EXECUTION TABLE

| 81 SCHEMA NUMBER | 82 SUBSCHEMA NUMBER | 83 GENERATION NUMBER | 84 INSTRUCTION TYPE | 85 SET VIEW NUMBER | 86 SET NUMBER | 87 RECORD VIEW NUMBER | 88 RECORD TYPE NUMBER | 89 ACCESS INSTRUCTION INFORMATION | 90 RETRIEVAL CONDITION INFORMATION |

| 91 WORK AREA | 92 WORK AREA | 93 WORK AREA |

MAIN MEMORY and in a directory in the format suitable for operating the data base system. Particularly, there is stored in the directory information obtained by editing the definition information required in practical use for forming a database or operating the database system, based on the definition information in the dictionary.

4,819,160

METHOD OF PROCESSING DATA ACCESS IN A DATABASE MANAGEMENT SYSTEM WITH DATA DICTIONARY DIRECTORY

BACKGROUND OF THE INVENTION

The present invention relates to an access control method for a database system, suitable for executing a valid and high-speed access to the database upon request from application programs.

Current database systems having a dictionary/directory are shown and described in connection with application programs in a document by Frank W. Allen, Mary E. S. Loomis, and Michael V. Mannino entitled "The Integrated Dictionary/Directory System", ACM Computing Surveys, Vol. 14, No. 12, June 1982. Reported in this document is a pre-compiler system: in a Cullinnane Database System, prior to compilation of application programs, definition information in the dictionary is retrieved to fetch information on files or subschema in order that an access instruction (in the DML, or Data Manipulation Language, form) to the database is converted into a CALL language indicating a branch of the program segments involved to other segments to obtain secondary source programs.

However, generation of such secondary source programs becomes an obstacle against high speed processing.

SUMMARY OF THE INVENTION

Therefore, it is a principle object of the present invention to provide an access control method to a database wherein the database access instructions in application programs are executed without generating secondary source programs.

It is another object of the present invention to execute application programs including database access instructions at high speed.

It is a further object of the present invention to provide an access control method for accessing a database wherein preliminary processings are executed for access to a database during compilation of an application program including database access instructions.

The gist of the present invention resides in that, during compiling a standard programming language, analysis of a DML is performed and also an object module is generated, which object module is supplied with confirmation information on agreement of database definition information with the access instruction, and location information of a directory table to be referenced during execution of database system management programs. Various processes are executed as above during compilation so that secondary source programs are not needed, and that the range of analysis is extended by using data information specific to application programs during DML analysis, the data information being obtained when a COPY statement or the like is executed. Since some processes required for compilation are executed beforehand, the quantity of processes for compilation is reduced to thereby improve the execution performance.

BRIEF DESCRIPTION OF THE DRAWINGS

FIG. 5 shows the construction of subschema definitions in the dictionary.

FIG. 6 shows the construction of generation information.

DESCRIPTION OF THE PREFERRED EMBODIMENTS

Figure 1:
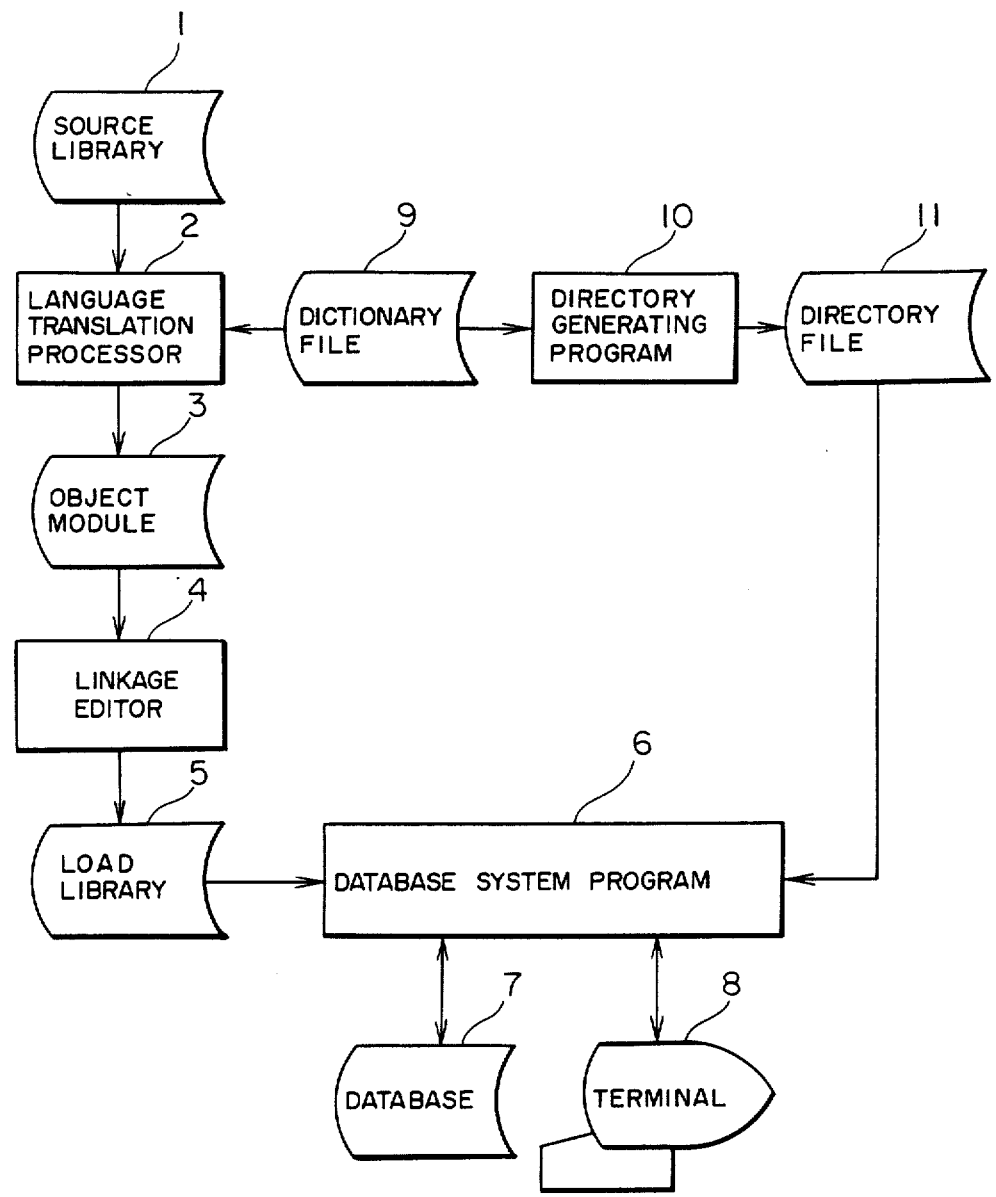
FIG. 1 shows the arrangement of a database system according to an embodiment of the present invention.

In a data dictionary/directory system, database system definition information such as database structure definitions, terminal/line definitions, system environment/operation definitions, is stored for management therefor in a dictionary in the format suitable for registration/update of the definition information, and in a directory in the format suitable for operating the data base system. Particularly, there is stored in the directory information obtained by editing the definition information required in practical use for forming a database or operating the database system, based on the definition information in the dictionary.

Referring to the various definition information on the database system stored in the directory, the database management system (DBMS) performs necessary processes for a database system access instruction in an application program, the access instruction including: a command instructing to load data into the database, a command instructing to retrieve necessary data from the database, a command instructing to update data in the database, or a command instructing to send messages to and receive messages from terminals.

Conventionally, when application programs are executed, coordination or agreement of an access instruction with various definition information of the database system is checked, and definition information necessary for executing the access instruction is retrieved. In such a case, a process has commonly been employed for searching objective ones among a plurality of the same types of definition information related to each other using a table or a pointer.

Whereas, in accordance with the present invention, some of the processes among those to be executed at the execution stage are carried out during compilation of application programs.

To this end, during compilation of application programs, reference is made to definition information on the database system stored in the dictionary to effect confirmation of availability of the access instruction to the database, the retrieval of information indicating locations of definition information to be referred to at the access stage or other information. In accordance with the present invention, a process is provided for incorporating such information into an object module.

Apart from the above, compiling application programs and executing the access to the database are usually carried out at a different time. Therefore, it is necessary to confirm agreement between definition information in the dictionary referred to when the application programs were compiled and definition information in the directory referred to when the application programs are being executed. That is, in a case where generation management of definition information is conducted, there is a possibility of causing an incorrect execution because of disagreement between the definition information.

For the above reason, another process is provided. In this process, generation management information in the definition information to be referred to during the compilation is incorporated within the object module generated during compiling of application programs. Then, the other generation information to be referred to for executing the application programs, is compared with the former information, and if an agreement is met, the programs are executed.

With these processes, execution of application programs can be made at high speed so that the difference between generations of the definition informations respectively at the compilation and access execution stages is eliminated, thereby ensuring a high speed and correct operation.

Processes heretofore carried out during executing application programs can be carried out while the programs are being compiled. Thus, the quantity of processes is reduced to improve the execution performance.

Further, advantageously, confirmation of agreement between definition information at both the compile stage and the execution stage, is readily performed.

Furthermore, invalid database access instructions can be detected while at the time when application programs are compiled, although these invalid instructions have been heretofore found either when an abnormal termination occurs during execution of the application programs, or when dealing with destruction of the database or disorder of other application programs resulting from incorrect data. Therefore, advantageously, the time for debugging of application programs can be shortened, and a valid execution of application programs can be ensured, leading to an improvement in the reliability of the entire database system.

The present invention will now be described more in detail with reference to the accompanying drawings showing preferred embodiments thereof.

Referring now to FIG. 1, reference numeral 1 represents a source library into which application programs using a standard programming language are stored, and reference numeral 2 represents a language processor for translating the standard programming language. An object library 3 stores an object module. A linkage editor 4 converts the object module into a load module in the format to be used in execution. A load library 5 stores the load module. A database system management program 6 is used in accessing (for storage, retrieval, update or the like) a database or in sending and receiving messages to and from terminals. Reference numeral 7 represents the database, 8 represents a terminal, 9 represents a dictionary file into which definition information of the database is stored in the source format. A directory generating program 10 generates definition information (hereinafter referred to as directory table) of the database, which table is obtained editing the definition information in the dictionary into the format suitable for reference by the database system management program during its execution. A directory file 11 stores the directory table.

The system diagram of FIG. 1 helps to understand the relationship between various files and their operations. In practice, the files 1, 3, 5, 7, 9 and 11 are stored in a magnetic disk, while the programs 2, 4, 6 and 10 are stored in a main storage of a computer which are functionally operated upon by the central processing unit.

The subject matter of the present invention is applied to the entire database system including the functions of accessing the database, sending and receiving messages to and from terminals, and so on. However, for simplifying the description of the invention, the following description is directed only to the database access. The definition specification of a database has been used in conformity with the ISO (X3H2-84-48) (Draft Proposed) Network Database Language (hereinafter abbreviated as NDL).

"Record" means collective data of a same type, and an aggregation of two records (correlated to each other) is called a set. A field constituting a record is called a component. In accordance with the NDL, the logical structure of a database is defined using a record type (information defining the record), a component type whose component constitutes the record, and a set type indicating the connection of two records. The logical structure of a database to be defined by the record type, component type, set type and others is called a logical schema hereinafter. One logical schema corresponds to one database. The structure obtained by re-defining part of a logical schema, i.e., the structure obtained by extracting from the logical schema those portions to be used with corresponding user application programs, is called a subschema.

A subschema is defined by a record view for the record type of a logical schema a component view for the component type, and a set view for the set type.

A database subscriber can access the database within the range of a subschema.

Figure 2:
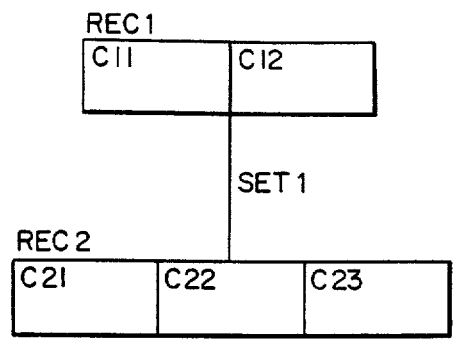
FIG. 2 shows an example of the logical arrangement of a data base.

An example of definition of a logical schema is shown hereinbelow. Assuming that the logical schema structure is of the type shown in FIG. 2, and the names of the records are REC1, REC2, the names of components constituting records are C11, C12 and C21, C22, C23, respectively, and the name of the set for the records is SET1. Then, this logical schema in conformity with the NDL can be defined as:

---

SCHEMA SCH1

| | -continued | |
|---|---|---|
| RECORD | REC1 | |
| ITEM | C11 | CHARACTER (2) |
| ITEM | C12 | CHARACTER (2) |
| RECORD | REC2 | |
| ITEM | C21 | CHARACTER (4) |
| ITEM | C22 | CHARACTER (2) |
| ITEM | C23 | CHARACTER (2) |
| SET | SET1 | |
| OWNER | REC1 | |
| ORDER | FIRST | |
| MEMBER | REC2 | |
| INSERTION | AUTOMATIC | |
| RETENTION | FIXED | |

"OWNER" means a parent record of the set, and "MEMBER" means a child record. For instance, a record of a company and a record of goods of that company constitute a single set having a parent-to-child The name of the logical schema is given SCH1.

Figure 3:
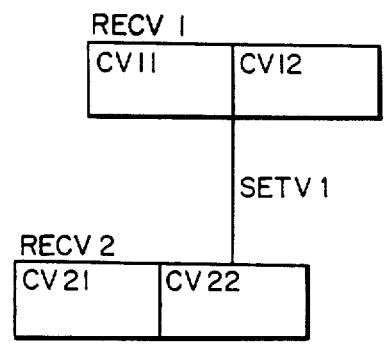
FIG. 3 is an illustrative usage range of the arrangement of FIG. 2, shown as views.

Similarly, assuming that the subschema structure is of the type shown in FIG. 3, and that the names of the record views are RECV1, RECV2, the names of the component views are CV11, CV12 and CV21, CV22, respectively, and the name of the set view for the record views REC1 and REC2 is SETV1. Then, the subschema structure can be defined as:

| SUBSCHEMA SUBS1 OF SCH1 | | | |
|---|---|---|---|
| RECORD | REC1 | RENAMED | RECV1 |
| ITEM | C11 | RENAMED | CV11 |
| ITEM | C12 | RENAMED | CV12 |
| RECORD | REC2 | RENAMED | RECV2 |
| ITEM | C21 | RENAMED | CV21 |
| ITEM | C22 | RENAMED | CV22 |
| SET | SET1 | RENAMED | SETV1 |

The name of this subschema is given SUBS1.

Figure 4:
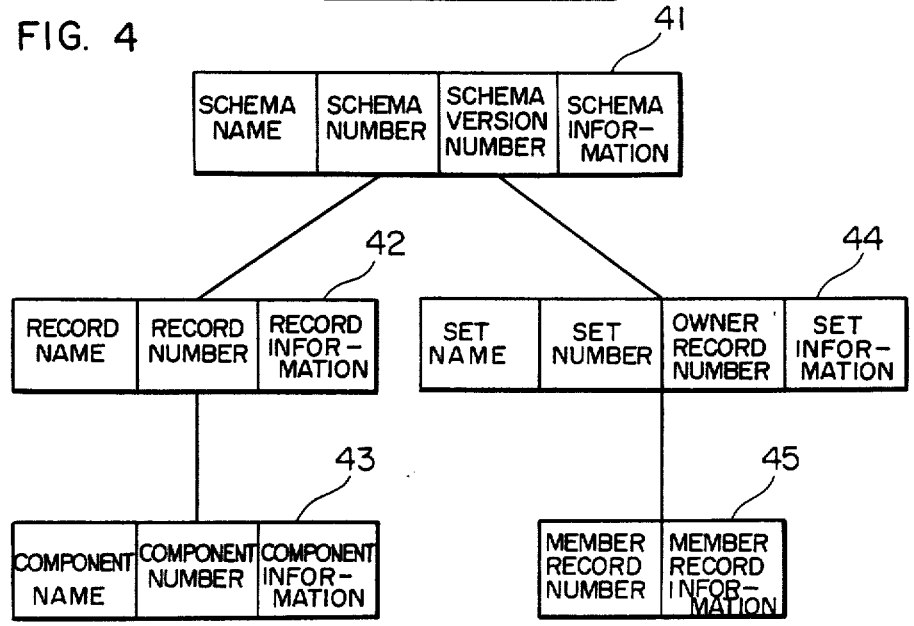
FIG. 4 shows the construction of logical schema definitions in the dictionary.

Logical schemata and subschemata are each given a name and a version number to store them in a dictionary. The structure of a dictionary into which definition information of the logical schema is stored, is shown in FIG. 4.

In the Figure, stored in a record 41 are a schema name, a schema number unambiguously determined within the system, a schema version number, and schema information related to the schema version number and the entirety of the logical schema. Stored in a record 42 are record names, a record number unambiguously determined within the logical schema, and record information for each record. Stored in a record 43 are component names, a component number unambiguously determined within the record, and information for each component. Stored in a record 44 is a set name, a set number unambigously determined within the logical schema, a record number of the owner record serving as a parent of the set, and set information in units of set. Stored in a record 45 are a record number of the member record serving as a child of the set, and member record information in units of member record.

A set relationship appears between records 41 and 42, records 42 and 43, records 41 and 44, and records 44 and 45, respectively.

Figures 5, 6:
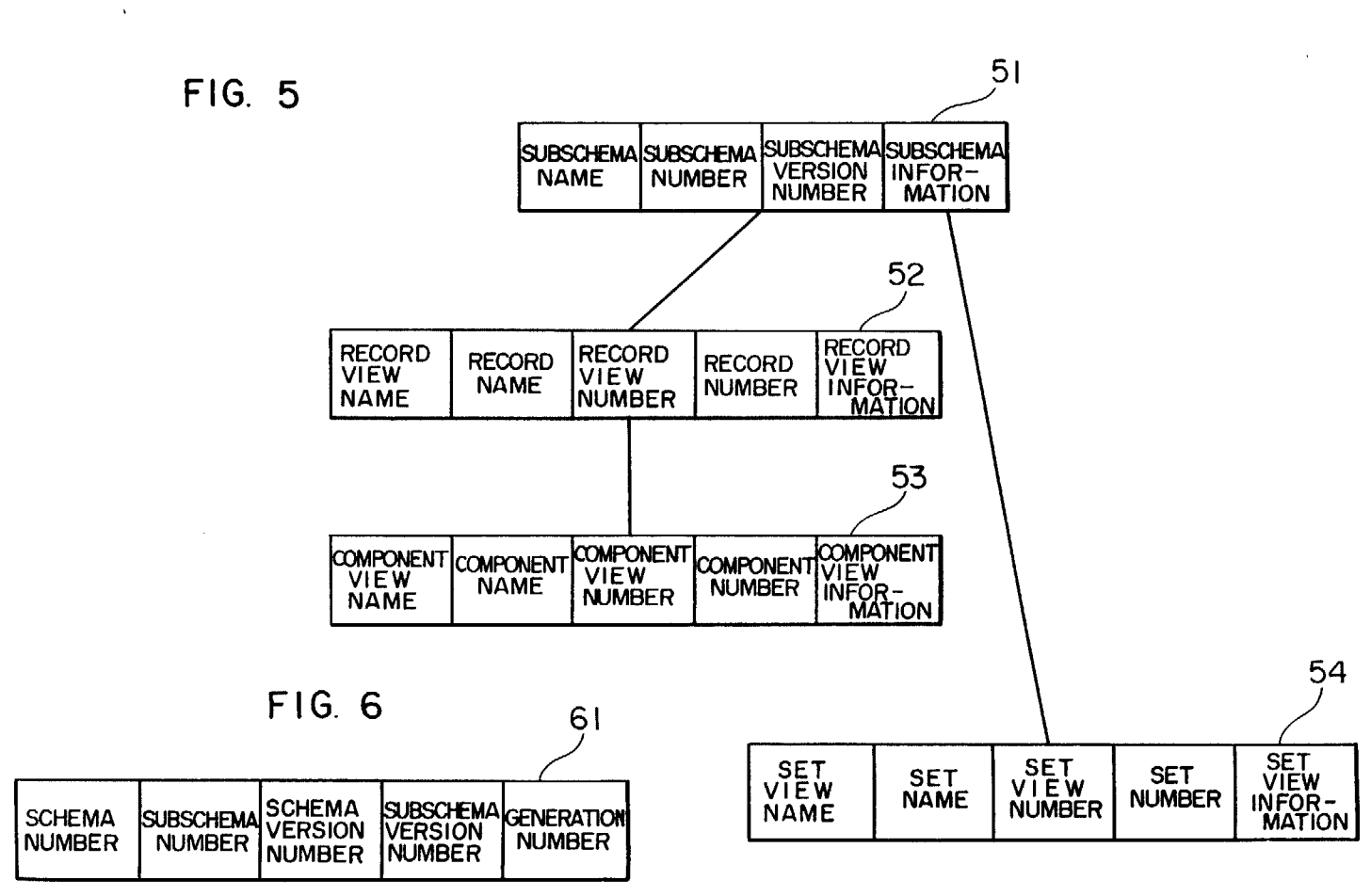

Similarly, the structure of a dictionary into which definition information of the subschema is stored, is shown in FIG. 5.

In the Figure, stored in a record 51 are a subschema name, a subschema number unambiguously determined within the subschema, a subschema version number, and subschema information related to the entirety of the subschema. Stored in a record 52 are record view names, a record view number unambiguously determined within the subschema, record names and record numbers respectively corresponding to the record views, and record view information in units of record view. Stored in a record 53 are component view names, a component view number unambiguously determined within the record views, component names and component numbers respectively corresponding to the component views, and component view information in units of component view. Stored in a record 54 are a set view name, a set view number unambiguously determined within the subschema, a set name and a set number corresponding to the set view, and set view information in units of set view. A set relationship appears between records 51 and 52, records 52 and 53, and records 51 and 54, respectively.

A generation number is also given to a pair of logical schema and subschema on condition that the logical schema identified by its name and version number and the subschema identified by its name and version number have a correct correspondence.

To a pair having the same name but different version numbers, a different generation name is given. The generation number varies depending on the time when a pair is produced, not on the order of the version number.

The structure of a dictionary into which generation numbers are stored is shown in FIG. 6. In the Figure, stored in a record 61 are a schema number and a version number respectively of a logical schema, and a subschema number and a version number respectively of the subschema correlated to the above-mentioned logical schema.

The definition information stored in the dictionary is edited into a format (directory table) by the directory generating program 10 shown in FIG. 1 such that the edited format can be easily referred to by the data database management program 6 during execution. The edited definition information is loaded in the directory file. Generating a directory from a dictionary is well known and therefore, the directory generating program 10 is not described further in detail. Together with loading the edited definition information, the generation number is also loaded in the directory file.

Figure 7:
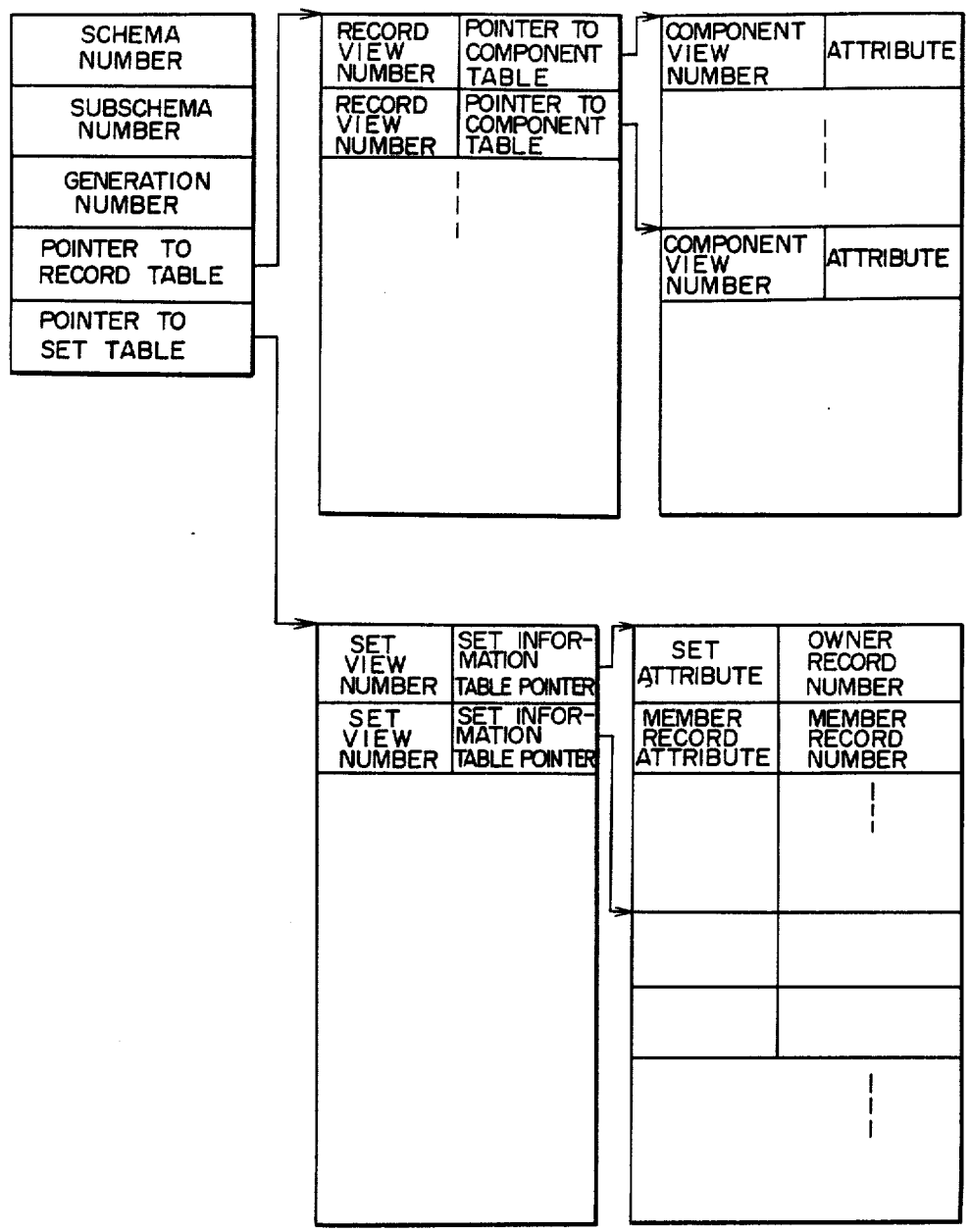
FIG. 7 shows the construction of a directory table.

An example of the structure of the directory table is shown in FIG. 7.

View information is divided into the same type, and each type is collected to form a table. The table is formed such that the order of arrangement of each independent information coincides with its view number in the dictionary.

A database subscriber prepares application programs using a standard programming lanugage such as the COBOL language, PL/1 language. The access instruction in an application program is described, for example, in the following way.

Assuming that the above-described SUBS1 is used as the structure of a subschema, then an access instruction in the format of the COBOL language will be described as in the following.

DATA DIVISION
SUBSCHEMA SECTION
DB SUBS1 WITHIN SCH1
∫
PROCEDURE DIVISION
∫

-continued

```
FIND FIRST RECV1 IN SETV1
WHERE C11='AB'AND C12='CD'
```

In the DATA DIVISION, the logical schema name and subschema name in the user data base are identified for use with the application program.

In the PROCEDURE DIVISION, an access instruction to the database is described. In the illustrative example, among a series of records defined by record view RECV1 belonging to set view SETV1, the first data having component C11 of a value 'AB' following component C12 of value 'CD' is retrieved.

Figure 8:
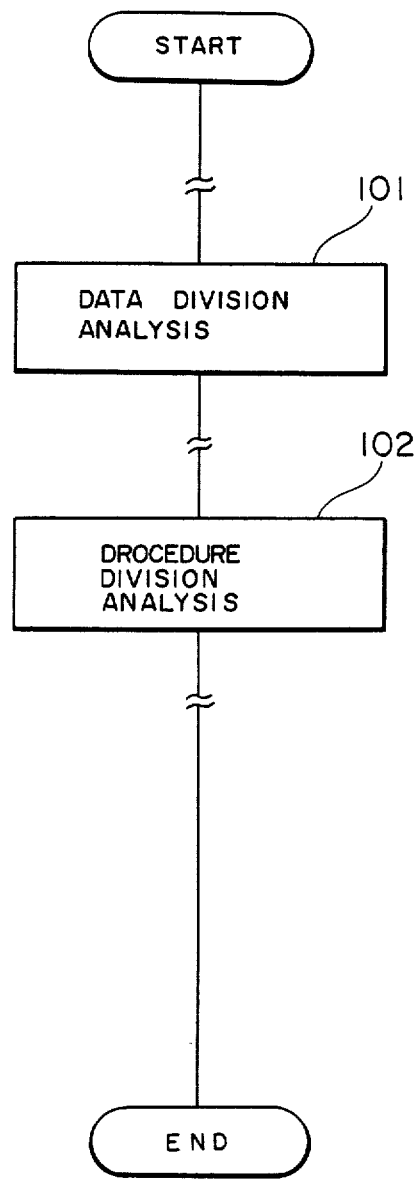
FIG. 8 is a flow chart showing related part of a language processor.

Application programs in the source library 1 shown in FIG. 1 are converted or compiled into an object module by the language processor 2 to be stored in the object library 3. The compile process includes a DATA DIVISION analysis 101, and a PROCEDURE DIVISION analysis 102, as shown in FIG. 8.

Figure 9:
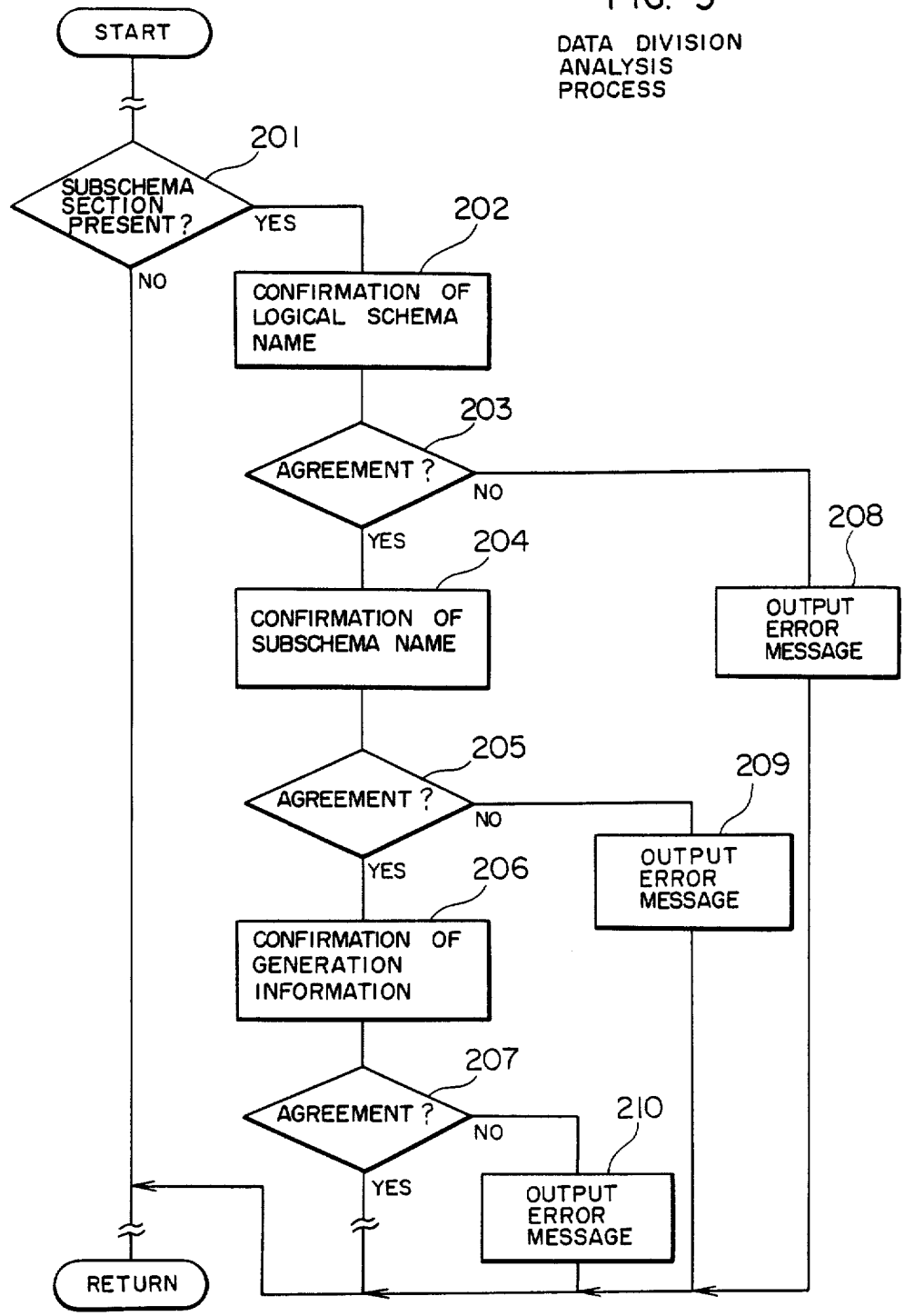
FIG. 9 is a flow chart showing part of the SUBSCHEMA DIVISION analyzing process shown in FIG. 8.

In the DATA DIVISION analysis 101, the availability of the SUBSCHEMA SECTION is confirmed as shown in FIG. 9.

FIG. 9 shows the detail of the DATA DIVISION analysis 101. First, it is judged if the user has stated the SUBSCHEMA SECTION (201). It is confirmed if the definition of the logical schema corresponding to the logical schema name identified by the SUBSCHEMA SECTION, is stored in the dictionary 9 shown in FIG. 1 (202).

If stored (203 Yes), it is confirmed similarly if the definition of the subschema corresponding to the subschema name is stored in the dictionary 9 (204).

If stored (205 Yes), on condition that a generation number is stated in the SUBSCHEMA SECTION, it is confirmed if a generation information as shown in FIG. 6 identified by the logical schema name, subschema name and generation number, is stored in the dictionary 9. If a generation number is not stated in the SUBSCHEMA SECTION, it is confirmed that there is a generation information as shown in FIG. 6 having the logical schema and the subschema name, and the latest generation number is used as the generation number of the SUBSCHEMA SECTION (206).

During the analysis of the SUBSCHEMA SECTION, if there is inconsistency or disagreement between the user statement and the definition information stored in the dictionary (203 No), (205 No), and (207 No), it is judged as a compilation error and an appropriate error message is outputted (208), (209) and (210).

Figure 10:
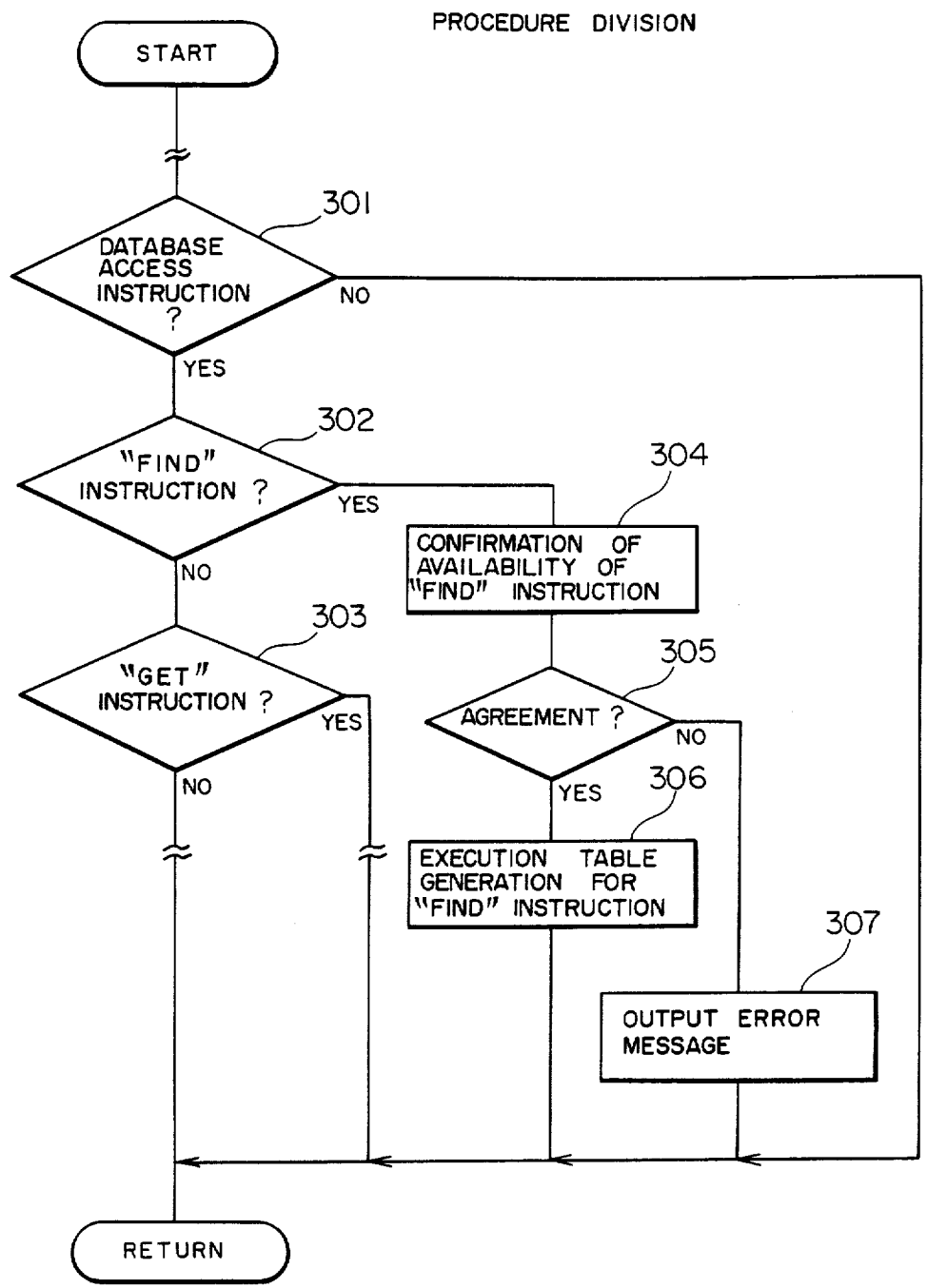
FIG. 10 is a flow chart showing part of the database access instruction analyzing process stated in the PROCEDURE DIVISION shown in FIG. 9.

The PROCEDURE DIVISION analysis 102 includes the process of confirming the availability of an access instruction to the data base system, and the process of generating the definition information table for the purpose of improving the execution performance of application programs. FIG. 10 shows the detail of the PROCEDURE DIVISION analysis 102. In the Figure, it is judged first if the statement in the PROCEDURE DIVISION is a database access instruction or not for each access instruction (301). When it is a database access instruction, then processing according to the type of the access is performed (302, 303, 304, 305, 306, 307). If the FIND instruction is affirmative (302 Yes), it is confirmed that the FIND instruction stated by the user has an availability (304), and it is judged if the FIND instruction has an agreement (305) either to output an error message (307) or to form a table to be used during execution of the FIND instruction (306).

Figure 11:
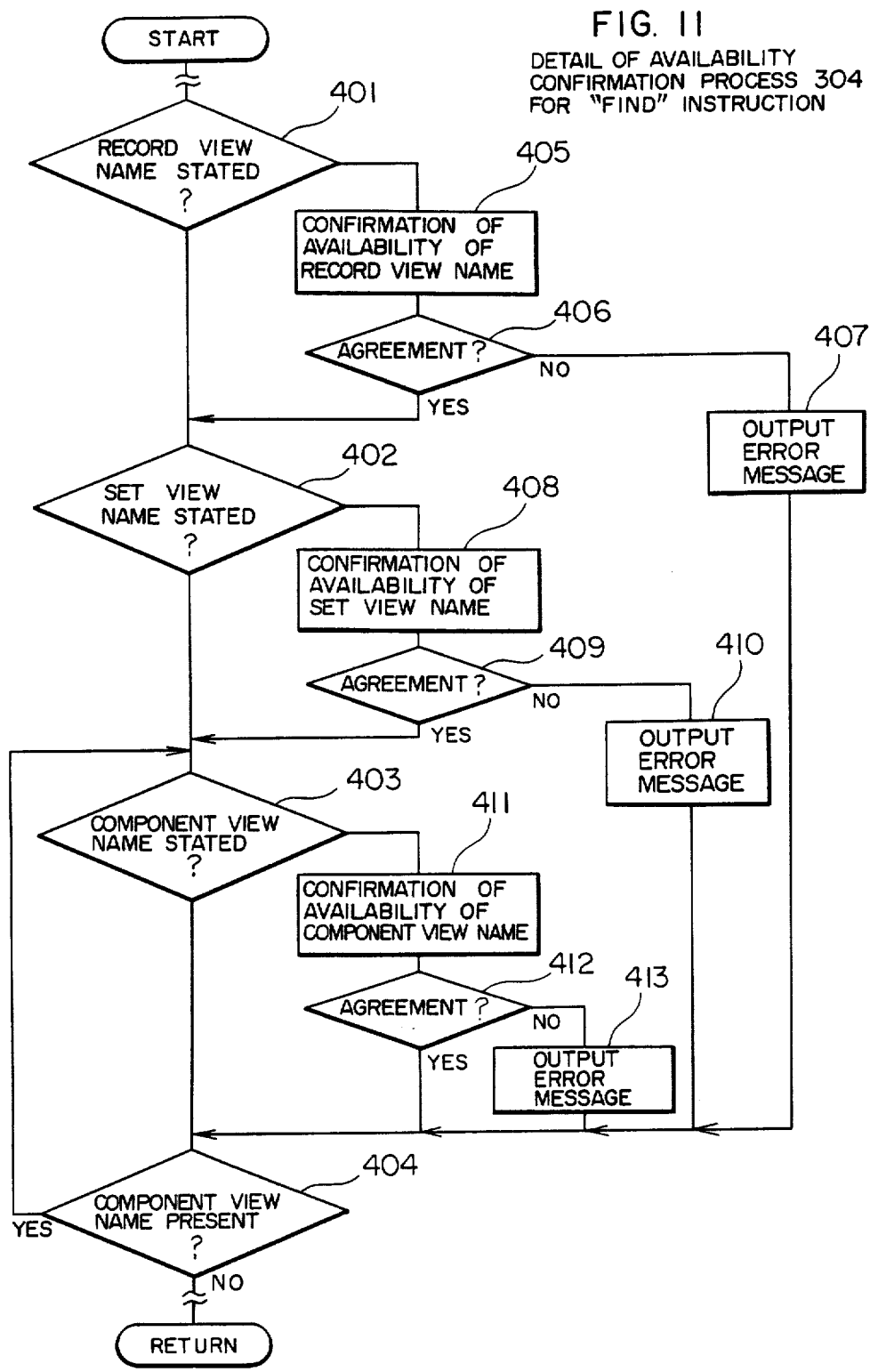
FIG. 11 is a flow chart showing briefly the process of confirming the availability of access instructions in the flow of FIG. 10.

The availability confirmation (304) of the FIND instruction will be described more in detail with reference to FIG. 11. In the availability confirmation process, it is confirmed if all the record view name, set view name and component view name to be stated in a FIND instruction are really stated and correspond to those defined by the subschema identified by the SUBSCHEMA SECTION in the access instruction concerned (401, 405, 402, 408, 403, 404, 411). If there is any non-coordination between the user statement and the definition information stored in the dictionary (406, 409, 412, No), it is judged as a compile error and an error message is outputted (407, 410, 413).

Figure 12:
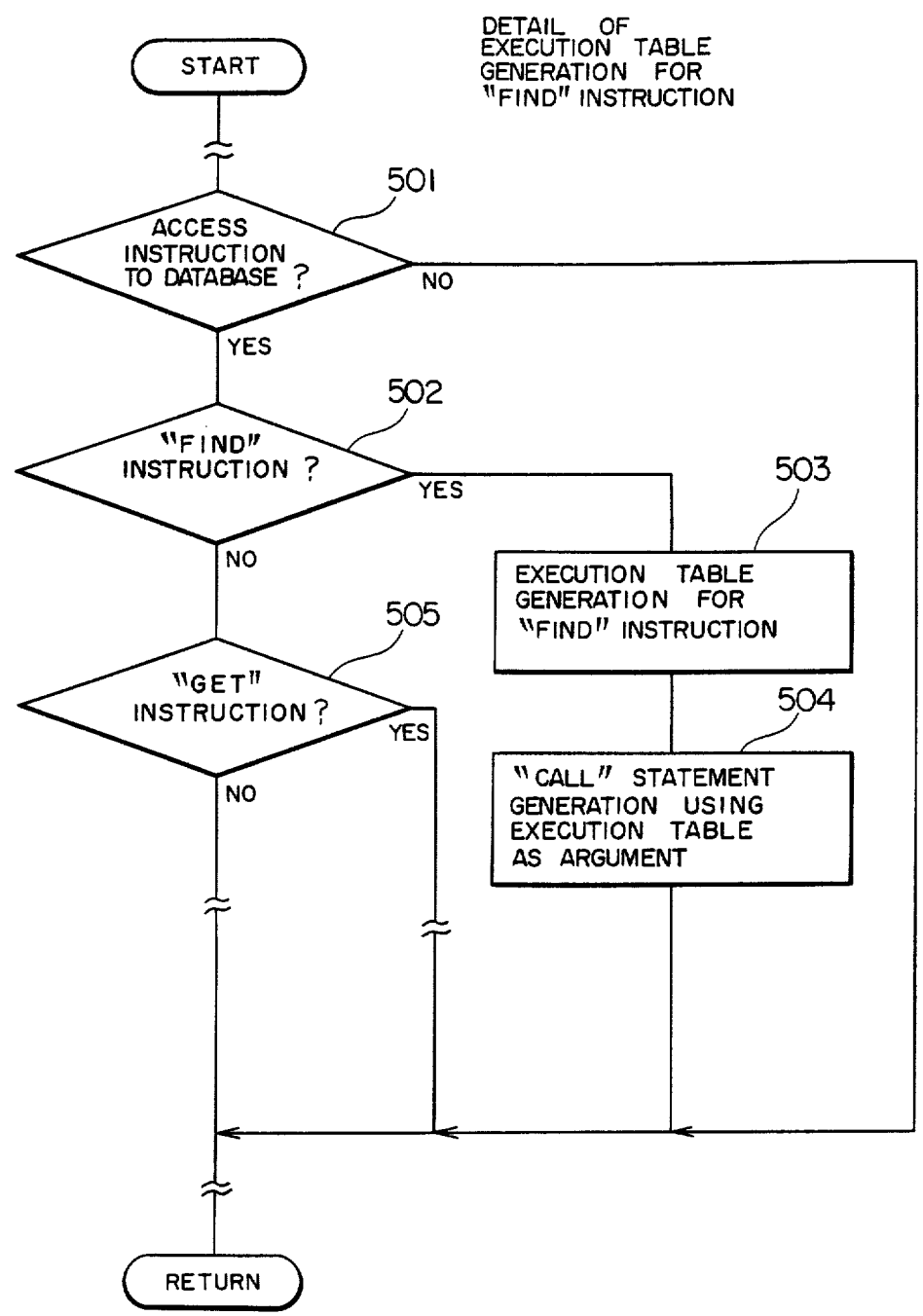
FIG. 12 is a flow chart showing briefly the process of generating an execution table used for access instructions in the flow of FIG. 10.

The process 306 for generating a table to be used during execution of the FIND instruction will be described with reference to FIG. 12. In this process, the execution table for a FIND instruction is generated for each access instruction (501, 502, 503). The structure of the table is shown in FIG. 13, which contains a schema number 81, subschema number 82, generation number 83, type of database system access instruction 84, set view number 85, set number 86, access instruction information such as retrieval direction, cursor control information 89, or the like, and retrieval condition information 90.

Figures 13, 15:
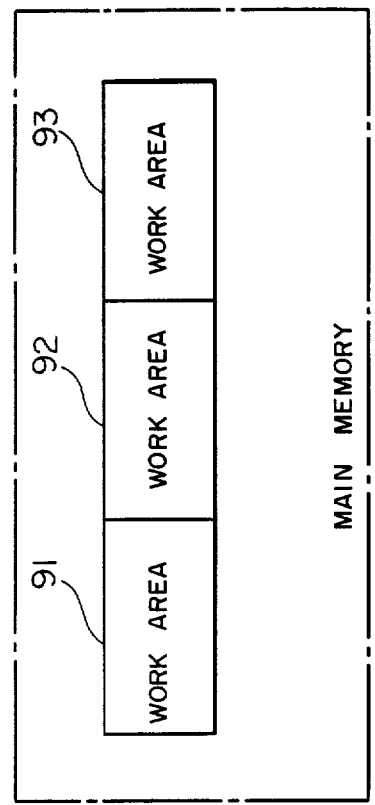
FIG. 13 shows the arrangement of the execution table generated in the flow of FIG. 12.
FIG. 15 shows the map of work areas in which a key representative of the directory table is saved, in the flow of FIG. 14.

Next, a CALL statement is generated (504) which uses the table shown in FIG. 13 as a first argument (data used for execution of a program and supplied from another program). This CALL statement is developed into objects as in the case of an ordinary CALL statement. (This CALL statement then transfers the process to the program which executes the database access, which program is not a user program but part of the database management program.) The compilation process of the user program is thus completed as above. Next, the description is directed to the execution stage. Upon actuation of the linkage editor 4 by the user, the object module in the object library 3 shown in FIG. 1 is converted into a load module to be stored in the load library 5.

Thereafter, when the user actuates the load module to issue a database system access instruction, access instruction information (execution table) is transferred, as an argument, from the load module to the database system management program 6. In response to the database access instruction in the database system management program 6, the directory 11 is loaded in the main storage, this process being shown in FIG. 14.

Figure 14:
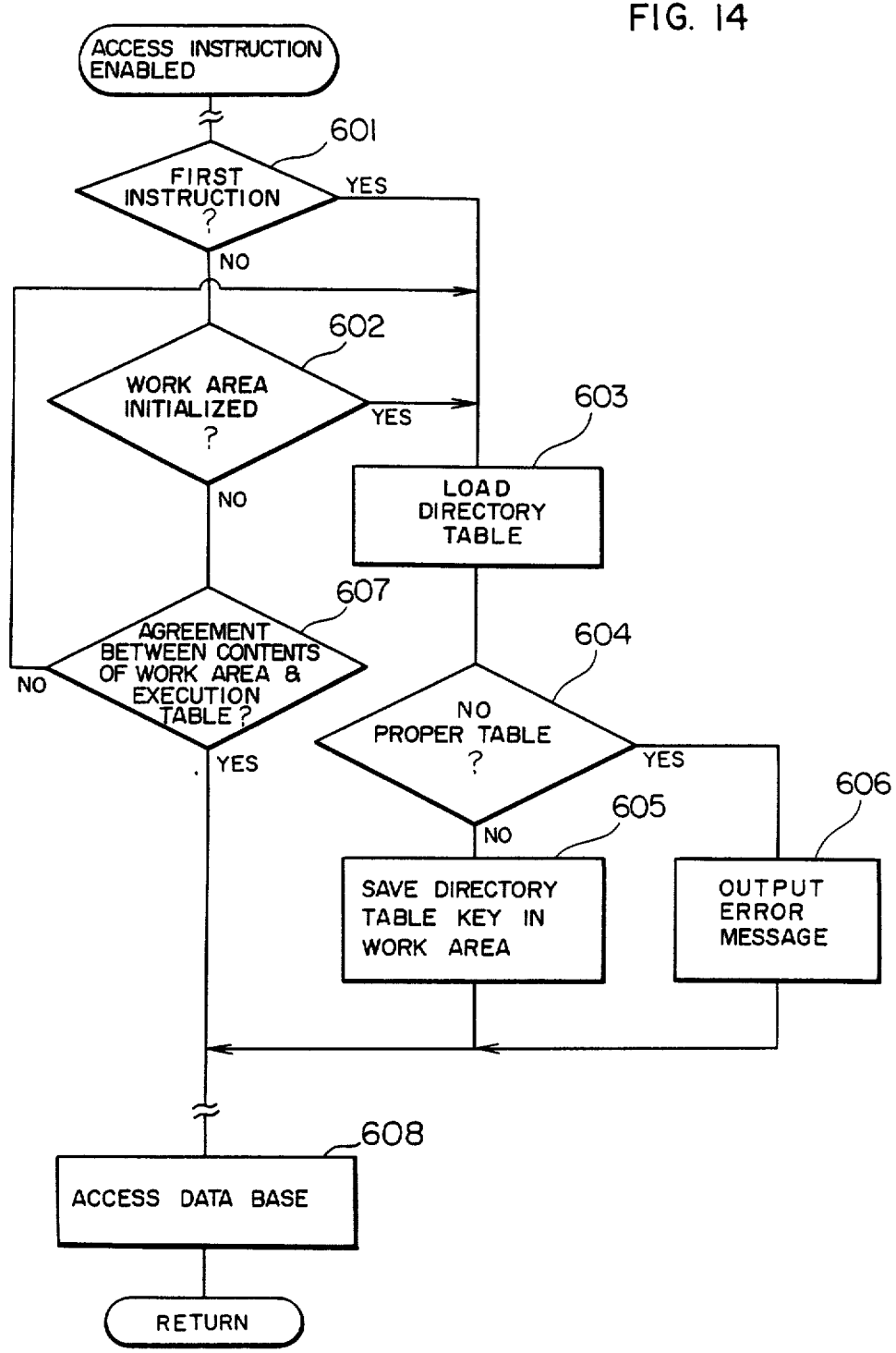
FIG. 14 is a flow chart showing briefly the loading process of a directory table from the directory file during execution of a database system management program, upon reception of a database access instruction from an application program.

As shown in FIG. 14, if the database access instruction is the first one from the user application program (601 Yes), the database system management program 6, by using as a key the schema number, subschema number and generation number of the content of the above-described execution table, transfers the directory table required for execution as shown in FIG. 7 to the main storage and loads it (603). If there is no directory table coincident with the key in the directory file (604), then an error message is outputted (606). The key is saved in a work area shown in FIG. 15 (605).

Figure 16:
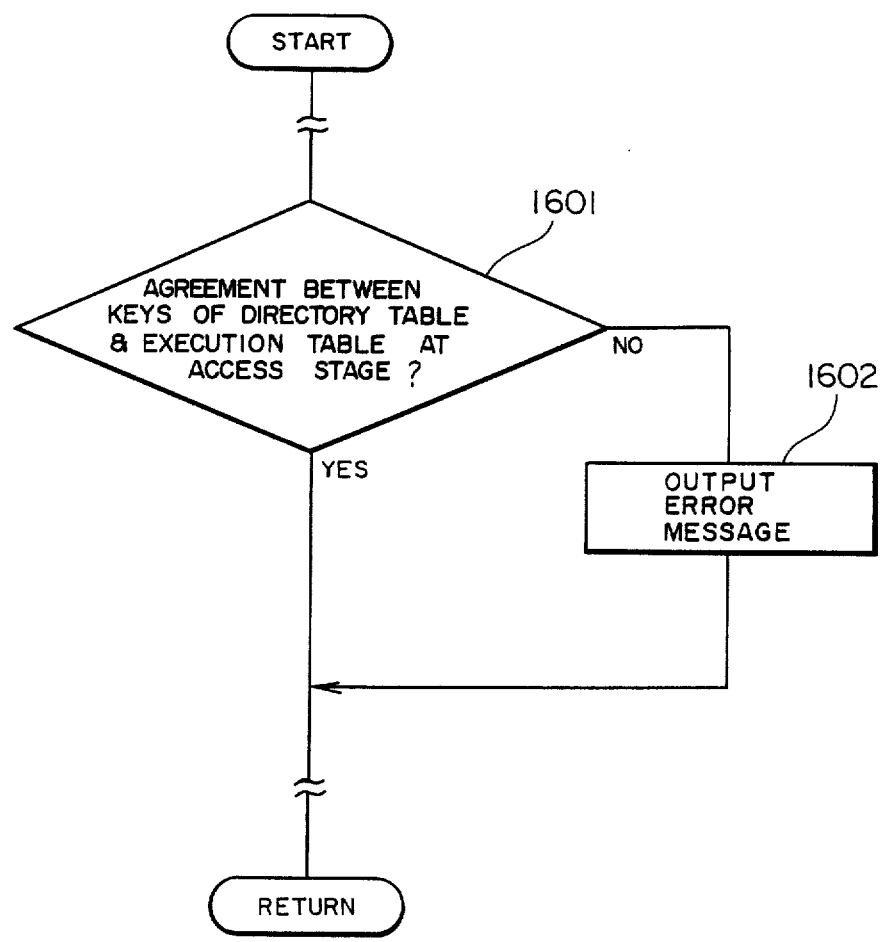
FIG. 16 is a flow chart showing briefly the process corresponding to that of FIG. 14, wherein a database management program operates to load the directory table prior to execution of application programs.

If the access instruction is the second or succeeding one (602 No), it is confirmed if the key (schema number, subschema number, and generation number) of the directory table loaded at the first instruction, agrees with the content of the execution table of the instruction now concerned (607). If not, a new directory table is loaded. The directory table may be loaded in the main storage before the database management program executes user application programs (UAP). When using this method, instead of the process shown in FIG. 14, the process shown in FIG. 16 is used. In FIG. 16, it is confirmed if the key of the directory table loaded beforehand in the main storage agrees with the key of the table used in executing the database system access instruction (1601). If not, an error message is outputted (1602).

As described so far, it is checked if there is a directory table which coincides with the table having a generation number and is used for execution. If affirmative, this directory table is used by the database management program. Therefore, it is ensured that the directories at the time of compiling and at the time of executing an application program, are checked as to their agreement and then used.

In the process of the database management program with respect to the access instruction, the record view name, set view name and component view name stated in the access instruction are replaced with the view numbers corresponding to the order of arrangement of each view information in the directory table as shown in FIG. 7, and stored in the execution table. In other words, the process heretofore performed at the compiling stage. Therefore, a process of retrieving the view information to be used at the execution stage is not needed to thereby improve the execution performance.

The present invention can be practiced through addition of the above processes to a conventional database access control system.

We claim:

1. A method of controlling a database access in a database system having a database, a dictionary for storing definition information defining the structure of the data base, and a directory or table generated on the basis of definition information stored in the dictionary, wherein a user program including a database access instruction is compiled and executed, comprising the steps of:

for a compiling stage of said user program:
a first step of confirming if said database access instruction is available to the database system with said definition information by comparing to determine if all of the components to be stated in said database access instruction are really stated and correspond to those defined in the dictionary;
a second step of retrieving information necessary for executing a database access, in response to said database access instruction, from said dictionary and generating an execution table containing said necessary information when the availability of the database access instruction is confirmed;
for an execution stage of said user program;
a third step of confirming that said directory stores at least part of said information stored in said execution table; and
a fourth step of executing a database access, in response to said database access instruction, by using said information stored in said execution table, when it is confirmed in said third step that said directory stores at least a part of said information stored in said execution table.

2. A method of controlling a database access according to claim 1, wherein said directory contains generation information which is representative of said database and is updated as a definition of said database is updated, said generation information also being stored in said execution table, and wherein said third step compares said generation information stored in said execution table with said generation information stored in said directory to detect correspondence therebetween.

3. A method of controlling a database access according to claim 1, wherein said dictionary contains a logical schema name representative of the entirety of said data base and a subschema name representative of a limited area available to said user program, and said database access instruction identifies said logical schema name and said subschema name, and wherein said first step confirms if said logical schema name and said subschema name identified by said database access instruction coincide with those in said dictionary.

4. A method of controlling a database access according to claim 1, wherein said second step comprises a fifth step of generating a CALL statement having said execution table as an argument following generation of said execution table.

5. A method of controlling a database access according to claim 2, wherein said directory further contains a logical schema number which is used instead of a logical schema name and is uniquely determined within the database system and a subschema number which is used instead of a subschema name and is uniquely determined within logical schema to be referred to, and said execution table further stores said logical schema number and said subschema number, and wherein said third step compares said logical schema number, said subschema number and generation information stored in said execution table with those stored in said directory.

* * * * *

UNITED STATES PATENT AND TRADEMARK OFFICE
CERTIFICATE OF CORRECTION

PATENT NO. :      4,819,160
DATED       :      April 4, 1989
INVENTOR(S) :     TANAKA, et al It is certified that error appears in the above-identified patent and that said Letters Patent is hereby corrected as shown below:

On the cover page under the heading 'United States Patent [19], please correct the inventors name to --Tanaka et al--;

Under the [75] Inventors, please correct the first inventors name from "Kazuaki Tanka" to --Kazuaki Tanaka--.

Signed and Sealed this

Ninth Day of November, 1993

Attest:

Attesting Officer

BRUCE LEHMAN

Commissioner of Patents and Trademarks